US010900840B1

(12) United States Patent
Pau

(10) Patent No.: US 10,900,840 B1
(45) Date of Patent: Jan. 26, 2021

(54) SNAPSHOT MUELLER MATRIX POLARIMETER

(71) Applicant: Arizona Board of Regents on Behalf of the University of Arizona, Tucson, AZ (US)

(72) Inventor: Stanley Pau, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 16/663,852

(22) Filed: Oct. 25, 2019

Related U.S. Application Data

(60) Provisional application No. 62/751,131, filed on Oct. 26, 2018.

(51) Int. Cl.
  *G01J 4/04* (2006.01)

(52) U.S. Cl.
  CPC ........................................ *G01J 4/04* (2013.01)

(58) Field of Classification Search
  CPC .......................................................... G01J 4/04
  USPC ......................................................... 356/367
  See application file for complete search history.

(56) References Cited

U.S. PATENT DOCUMENTS

| | | | | |
|---|---|---|---|---|
| 3,932,039 A | * | 1/1976 | Frey ........................ | G01B 11/26 356/138 |
| 5,081,348 A | * | 1/1992 | Siddiqui ................... | G01J 4/04 250/225 |
| 5,416,324 A | * | 5/1995 | Chun ....................... | G01J 4/00 250/332 |
| 8,866,997 B2 | | 10/2014 | Pau et al. | |
| 9,551,618 B2 | * | 1/2017 | Acher ...................... | G01J 4/04 |
| 2004/0036876 A1 | * | 2/2004 | Davis ....................... | G01J 4/00 356/367 |
| 2009/0021598 A1 | * | 1/2009 | McLean .................. | G01J 3/447 348/222.1 |

(Continued)

FOREIGN PATENT DOCUMENTS

| | | |
|---|---|---|
| CN | 105021282 | 12/2017 |
| KR | 101812608 | 12/2017 |

OTHER PUBLICATIONS

R. M. A. Azzam "Stokes-vector and Mueller-matrix polarimetry," J. Optical Society of America A, vol. 33, No. 7, p. 1396 (2016).

(Continued)

*Primary Examiner* — Roy M Punnoose
(74) *Attorney, Agent, or Firm* — Perkins Coie LLP

(57) ABSTRACT

Methods and devices for measuring full or partial Mueller matrix information in a single shot are described. One single shot polarimeter includes a polarization filter that is positioned to receive collimated light from a light source and to produce light having different polarization states. The polarization filter includes at least four sections, where each section receives a portion of the collimated light and produces light of a particular polarization state, which is spatially separated from light produced by other sections of the polarization filter. An imaging component images the sections of the polarization filter onto a plane of a sample object. One or more optical elements receive the light from the sample object and image a section of the sample object onto a detector. The disclosed devices and methods enable the measurement of the Mueller matrix of the sample with high signal-to-noise ratios.

21 Claims, 9 Drawing Sheets

(56) References Cited

U.S. PATENT DOCUMENTS

| | | | |
|---|---|---|---|
| 2016/0124250 A1* | 5/2016 | Schonbrun | H04N 9/04521 348/336 |
| 2016/0170110 A1 | 6/2016 | Pau et al. | |
| 2018/0100731 A1 | 4/2018 | Pau | |

OTHER PUBLICATIONS

J. S. Tyo et al., "Review of passive imaging polarimetry for remote sensing applications," Appl. Opt. 45(22), 5453-5469 (2006).

X. Tu et al., "Division of amplitude RGB full-Stokes camera using micro-polarizer arrays," Optics Express 25, 33160 (2017).

M. N. Miskiewicz et al., "Direct-writing of complex liquid crystal patterns," Optics Express vol. 22, No. 10, 12691 (2014).

K. Shinoda et al., "Snapshot multispectral polarization imaging using a photonic crystal filter array," Optics Express vol. 26, No. 12 (2018).

"Optical Imaging Market worth 1.75 Billion USD by 2020," Markets and Markets available at https://www.marketsandmarkets.com/PressReleases/optical-imaging-technologies.asp, (2016).

S. Kemme, "Snapshot polarimetry enables new signature opportunities for remote sensing", SPIE, available at https://www.spie.org/news/0861-snapshot-polarimetry-enables-new-signature-opportunities-for-remote-sensing?SSO=1, (2007).

T. Mu et al., Snapshot linear-Stokes imaging spectropolarimeter using division-of-focal-plane polarimetry and integral field spectroscopy, Sci Rep 7, 42115 (2017).

R. A. Chipman, Mueller Matrices, Chapter 14 in Handbook of Optics, 3rd edition, vol. 1, Geometrical and Physical Optics, Polarized Light, Components and Instruments, McGraw-Hill, NY 2009.

R. A. Chipman, Polarimetry, Chapter 15 in Handbook of Optics, 3rd edition, vol. 1, Geometrical and Physical Optics, Polarized Light, Components and Instruments, McGraw-Hill, NY 2009.

* cited by examiner $$\begin{array}{|c|c|c|c|}\hline S_d & S_h & S_l & S_p \\\hline S_c & S_g & S_k & S_o \\\hline S_b & S_f & S_j & S_n \\\hline S_a & S_e & S_i & S_m \\\hline\end{array}$$

FIG. 5B $$\begin{array}{|c|c|}\hline S_B & S_D \\\hline S_A & S_C \\\hline\end{array}$$

SNAPSHOT MUELLER MATRIX POLARIMETER

CROSS REFERENCE TO RELATED APPLICATIONS

This application claims priority to the provisional application with Ser. No. 62/751,131, titled "Snapshot Mueller Matrix Polarimeter," filed Oct. 26, 2018. The entire contents of the above noted provisional application are incorporated by reference as part of the disclosure of this document.

TECHNICAL FIELD

The subject matter of this patent document relates to polarization sensing and measurement, and specifically to the optical devices and methods to facilitate the determination of Mueller matrices.

BACKGROUND

Polarization is a property of light that describes the direction of the electromagnetic wave that is perpendicular to the direction of motion of the wave. The different polarization states are linear, elliptical and circular polarizations. In some applications, different characteristics of an object, such as depth variations, the objects composition and other properties can be determined based on the states of polarization of light that is either reflected or transmitted from the object. The polarization state of the light can be determined based on the Mueller matrix which provides the most general and complete description of how the object responds to an incident polarized light in either reflection or transmission. It is therefore beneficial to develop techniques that can efficiently and accurately estimate the Mueller matrix for various objects.

SUMMARY OF CERTAIN EMBODIMENTS

The disclosed embodiments relate to methods and devices for measuring full or partial Mueller matrix information in a single shot. The Mueller matrix measurements can be done for a single location, or multiple locations, of a test object in a single shot. The disclosed devices and techniques have applications in many areas of technology, including remote sensing, ellipsometry, metrology, material characterization, imaging, and others.

One aspect of the disclosed embodiments relates to a single shot polarimeter that includes a first optical element or elements positioned to receive light from a light source and to produce collimated light, a polarization filter positioned to receive the collimated light and to produce light having different polarization states. The polarization filter includes at least four sections, where each section of the polarization filter is configured to receive a portion of the collimated light and to produce light having a particular polarization state that is spatially separated from light produced by other sections of the polarization filter. The single shot polarimeter further includes a second optical element or elements positioned to receive the light having different polarization states and to image the at least four sections of the polarization filter onto a plane of a sample object. The single shot polarimeter also includes an imaging section that includes one or more optical elements positioned to receive light that is either transmitted through or reflected from the sample object and to image a section of the sample object onto a detector.

BRIEF DESCRIPTION OF THE DRAWINGS

FIG. 5A illustrates a top view of one example filter array in accordance with the disclosed embodiments.

FIG. 5B illustrates a top view of another example filter array in accordance with the disclosed embodiments.

FIG. 6 illustrates a top view of another example filter array that includes multiple sets of filters in accordance with an example embodiment.

DETAILED DESCRIPTION

The polarization state of light can be described by a 4-component Stokes vector S, which consists of the four elements $S_0$, $S_1$, $S_2$, and $S_3$. $S_0$ represents the intensity of an optical field; $S_1$ and $S_2$ denote the affinity towards 0° and 45° linear polarization, respectively; and $S_3$ expresses the difference between right and left circular polarizations. In this document, vectors and matrices are denoted as bold, whereas the elements of vectors and matrices are denoted using normal font. Mathematically, the four components can be defined as follows:

$$S = \begin{bmatrix} S_0 \\ S_1 \\ S_2 \\ S_3 \end{bmatrix} = \begin{bmatrix} P_H + P_V \\ P_H - P_V \\ P_{45} - P_{135} \\ P_R - P_L \end{bmatrix}$$

Here P are flux measurements performed using ideal polarizers in front of a radiometer as follows:

$P_H$: horizontal linear polarizer (0°), $P_V$: vertical linear polarizer (90°), $P_{45}$: linear polarizer (45°), $P_{135}$: linear polarizer (135°), $P_R$: right circular polarizer, $P_L$: left circular polarizer.

A Stokes vector polarimeter can be utilized to measure the Stokes vector of light. The Mueller matrix M of a polarization changing device is defined to be a 4 by 4 matrix that converts an incoming Stokes vector $S_{in}$ to an outgoing Stokes vector $S_{out}$.

$$S_{out} = \begin{bmatrix} S_{0,out} \\ S_{1,out} \\ S_{2,out} \\ S_{3,out} \end{bmatrix} = MS_{in} = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix} \begin{bmatrix} S_{0,in} \\ S_{1,in} \\ S_{2,in} \\ S_{3,in} \end{bmatrix}.$$

Elements of the Mueller matrix are real and are functions of the direction of the propagation, k, and wavelength, λ. The elements contain all of the polarization properties of an object and can be measured using a polarimeter. A Mueller matrix polarimeter can be utilized to measure the Mueller matrix of an object.

Figure 1:
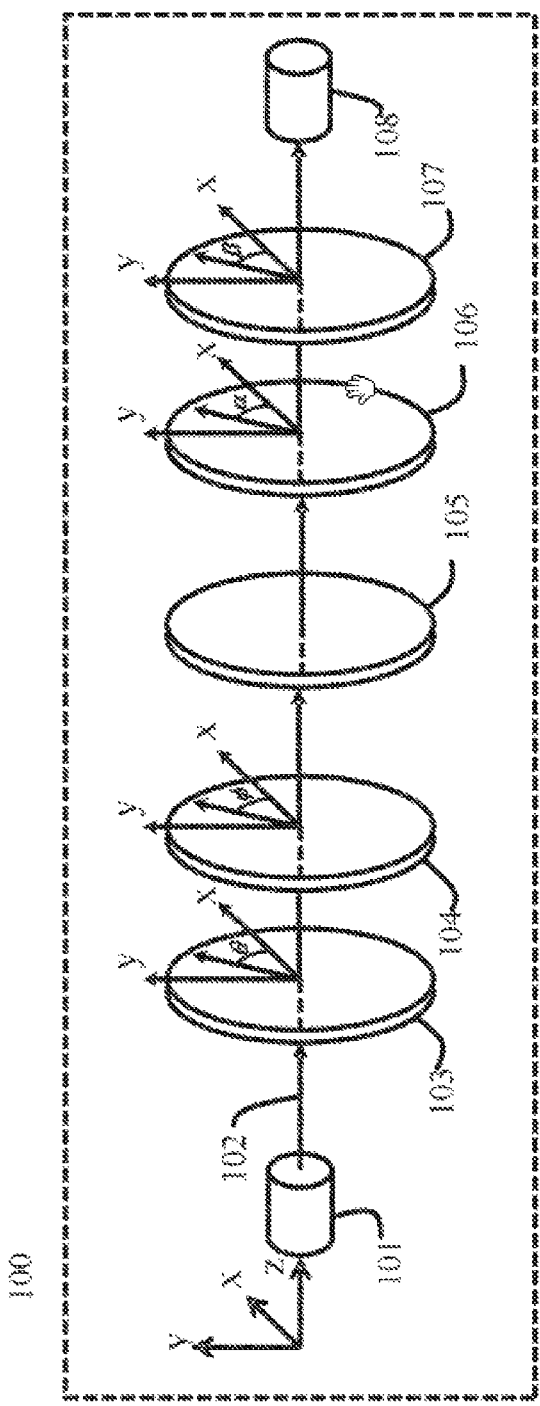
FIG. 1 illustrates a dual rotating retarder Mueller matrix polarimeter.

In conventional Mueller matrix polarimetry, output of a polarization state generator is directed to the object of interest, and the reflected and transmitted light is measured using a polarization state analyzer. The dual rotating retarder Mueller matrix polarimeter 100 as shown in FIG. 1 is a very common Mueller matrix polarimeter configuration. A polarization state generator is made up of a light source 101 (which can be broadband, narrowband or tunable), a linear polarizer 103 at angle θ, and a linear retarder 104 at angle φ. Both the polarizer 103 and retarder 104 operate in the wavelength of interest, i.e., having low loss and being achromatic. The output light passes through a sample 105 and is collected by a polarization state analyzer. The sample 105 can be mounted on translational and rotational stages. The analyzer includes a linear retarder 106 at angle α, a linear polarizer 107 at angle β and a light detector 108. In an ideal situation, the Mueller matrix of the retarders and polarizers are known at different wavelengths, and the light source and detector are well characterized.

The Mueller matrix of the sample 105 is unknown and can be measured by varying the angles of the polarization state generator and measuring the output Stokes vector using the polarization state analyzer. For example, the generator can be configured to generate four different polarization states at four different times. The Stokes vector at the four different times are $S_{in}(t_1)$, $S_{in}(t_2)$, $S_{in}(t_3)$ and $S_{in}(t_4)$. Light of the different Stokes vector passes through the sample and is measured by the analyzer as $S_{out}(t_1)$, $S_{out}(t_2)$, $S_{out}(t_3)$ and $S_{out}(t_4)$. If $M_{sample}$ is the Mueller matrix of the sample, then $$S_{out}(t) = \begin{bmatrix} S_{0,out}(t) \\ S_{1,out}(t) \\ S_{2,out}(t) \\ S_{3,out}(t) \end{bmatrix} = M_{sample}S_{in}(t) = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix} \begin{bmatrix} S_{0,in}(t) \\ S_{1,in}(t) \\ S_{2,in}(t) \\ S_{3,in}(t) \end{bmatrix}.$$

Here we assume that the delay of light propagation from source to detector is small and negligible. We also assume that $M_{sample}$ is not changing in time, or at least varying slowly compared with the measurement time. For four measurements at four different times, the four input and output Stokes vectors can be put into a four by four matrix, as follows.

$$\begin{bmatrix} S_{0,out}(t_1) & S_{0,out}(t_2) & S_{0,out}(t_3) & S_{0,out}(t_4) \\ S_{1,out}(t_1) & S_{1,out}(t_2) & S_{1,out}(t_3) & S_{1,out}(t_4) \\ S_{2,out}(t_1) & S_{2,out}(t_2) & S_{2,out}(t_3) & S_{2,out}(t_4) \\ S_{3,out}(t_1) & S_{3,out}(t_2) & S_{3,out}(t_3) & S_{3,out}(t_4) \end{bmatrix} =$$

$$M_{sample} \begin{bmatrix} S_{0,in}(t_1) & S_{0,in}(t_2) & S_{0,in}(t_3) & S_{0,in}(t_4) \\ S_{1,in}(t_1) & S_{1,in}(t_2) & S_{1,in}(t_3) & S_{1,in}(t_4) \\ S_{2,in}(t_1) & S_{2,in}(t_2) & S_{2,in}(t_3) & S_{2,in}(t_4) \\ S_{3,in}(t_1) & S_{3,in}(t_2) & S_{3,in}(t_3) & S_{3,in}(t_4) \end{bmatrix}.$$

The Muller matrix of the sample can be calculated by calculation of the inverse as follows:

$$M_{sample} = \begin{bmatrix} S_{0,out}(t_1) & S_{0,out}(t_2) & S_{0,out}(t_3) & S_{0,out}(t_4) \\ S_{1,out}(t_1) & S_{1,out}(t_2) & S_{1,out}(t_3) & S_{1,out}(t_4) \\ S_{2,out}(t_1) & S_{2,out}(t_2) & S_{2,out}(t_3) & S_{2,out}(t_4) \\ S_{3,out}(t_1) & S_{3,out}(t_2) & S_{3,out}(t_3) & S_{3,out}(t_4) \end{bmatrix}$$

$$\begin{bmatrix} S_{0,in}(t_1) & S_{0,in}(t_2) & S_{0,in}(t_3) & S_{0,in}(t_4) \\ S_{1,in}(t_1) & S_{1,in}(t_2) & S_{1,in}(t_3) & S_{1,in}(t_4) \\ S_{2,in}(t_1) & S_{2,in}(t_2) & S_{2,in}(t_3) & S_{2,in}(t_4) \\ S_{3,in}(t_1) & S_{3,in}(t_2) & S_{3,in}(t_3) & S_{3,in}(t_4) \end{bmatrix}^{-1}.$$

Elements of $M_{sample}$ are determined by different generator and analyzer states. In practice, the data reduction equations are more complex, and the number of measurements is greater than four. The general problem of data reduction for a polarimeter is an active area of research and includes many challenges. One problem is finding a set of states, $S_{in}(t)$, that maximizes the signal to noise ratio of measuring the unknown Mueller matrix.

Ellipsometry is a technique to measure optical properties of thin film such as thickness, real and imaginary part of the refractive index. The measurements of reflectance and transmission of the film at different incident angles and wavelengths permit the calculation of optical properties by fitting the data to reflectance and transmission equations. For anisotropic materials, the optical properties can be described by a refractive index tensor. Components of the tensor can be calculated from the Mueller matrix which can be measured using a Mueller matrix polarimeter.

Traditional polarimeters operate sequentially by generating different polarization states and analyzing the output states at different times. The measurement is generally limited by the total time to cycle through all the different states and integrating the signals in order to obtain enough quality data for the data reduction process. One feature of the disclosed embodiments includes replacing the sequential polarization state generator with a constant wavefront of different polarization states. In doing so, the disclosed embodiments allow the polarization state of a target to be deciphered in a single snapshot instead of having to rotate through multiple sets of polarizers to acquire the same information.

Figure 2:
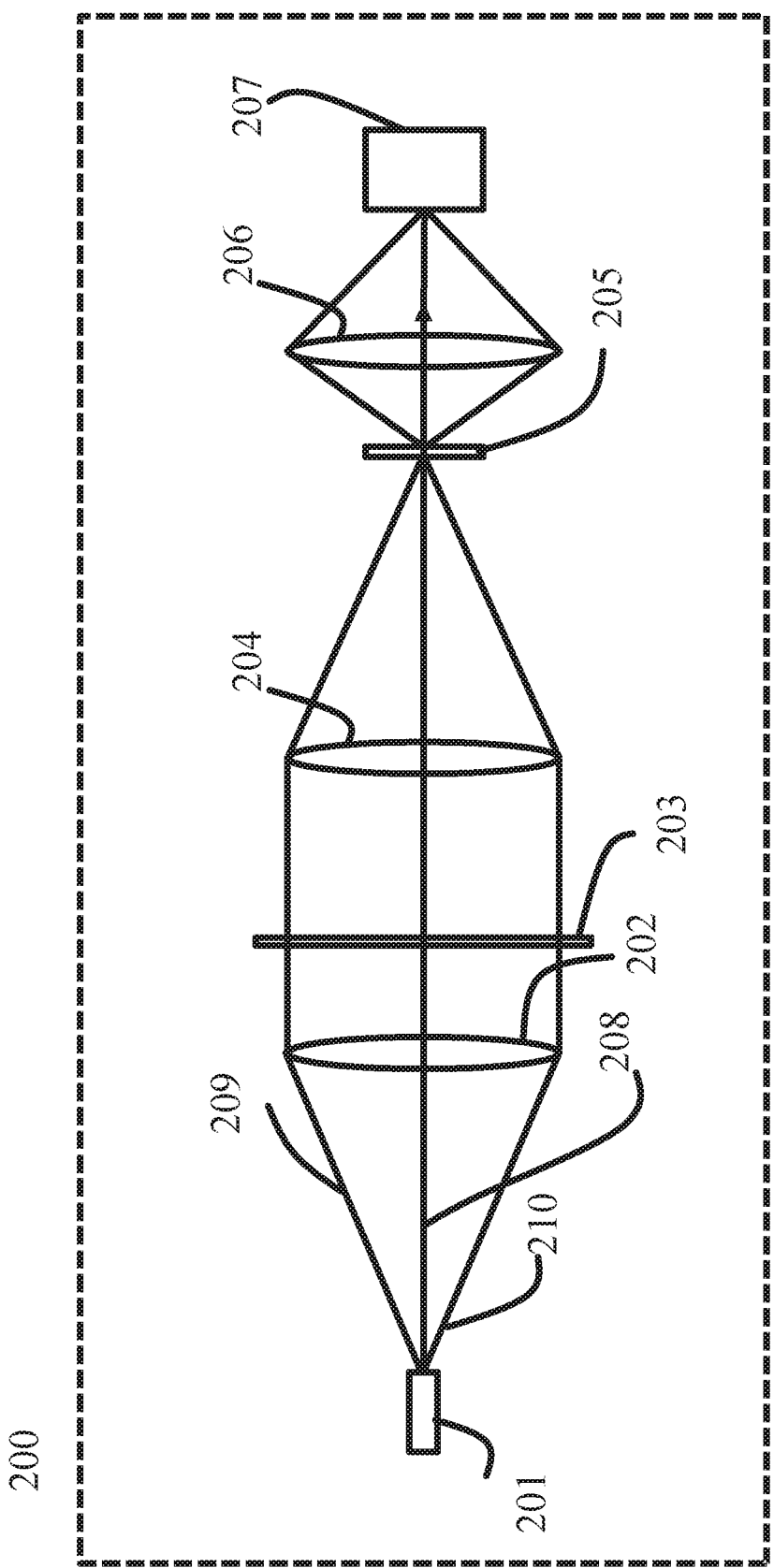
FIG. 2 illustrates a snapshot Mueller matrix polarimeter in a transmission configuration in accordance with an example embodiment.

FIG. 2 shows a snapshot Mueller matrix polarimeter 200 in a transmission configuration in accordance with an example embodiment. A light source 201 generates light rays, 208, 209, and 210, which are collimated by a lens 202 and pass through a polarizer filter array 203 (for simplicity, only three rays are depicted). The light source 201 can be, for example, a laser light source of a particular wavelength, or alternatively a white light source, or a white light source that is filtered to remove certain spectral components, or the like. Light, after passing through the filter 203, has different polarization states at different locations and is imaged onto the sample 205 by an imaging lens 204. For example, the lens 204 produces a de-magnified image at the plane where the sample 205 is located. The degree of de-magnification can be controlled by selecting the lens 204 (or a series of lenses). Light of different polarization states passes through the sample and is imaged again to an imaging polarimeter 207 by an imaging lens 206. The configuration shown in FIG. 2 measures the transmission Mueller matrix, and can be suitable for samples that are transparent or partially transparent.

Figure 3:
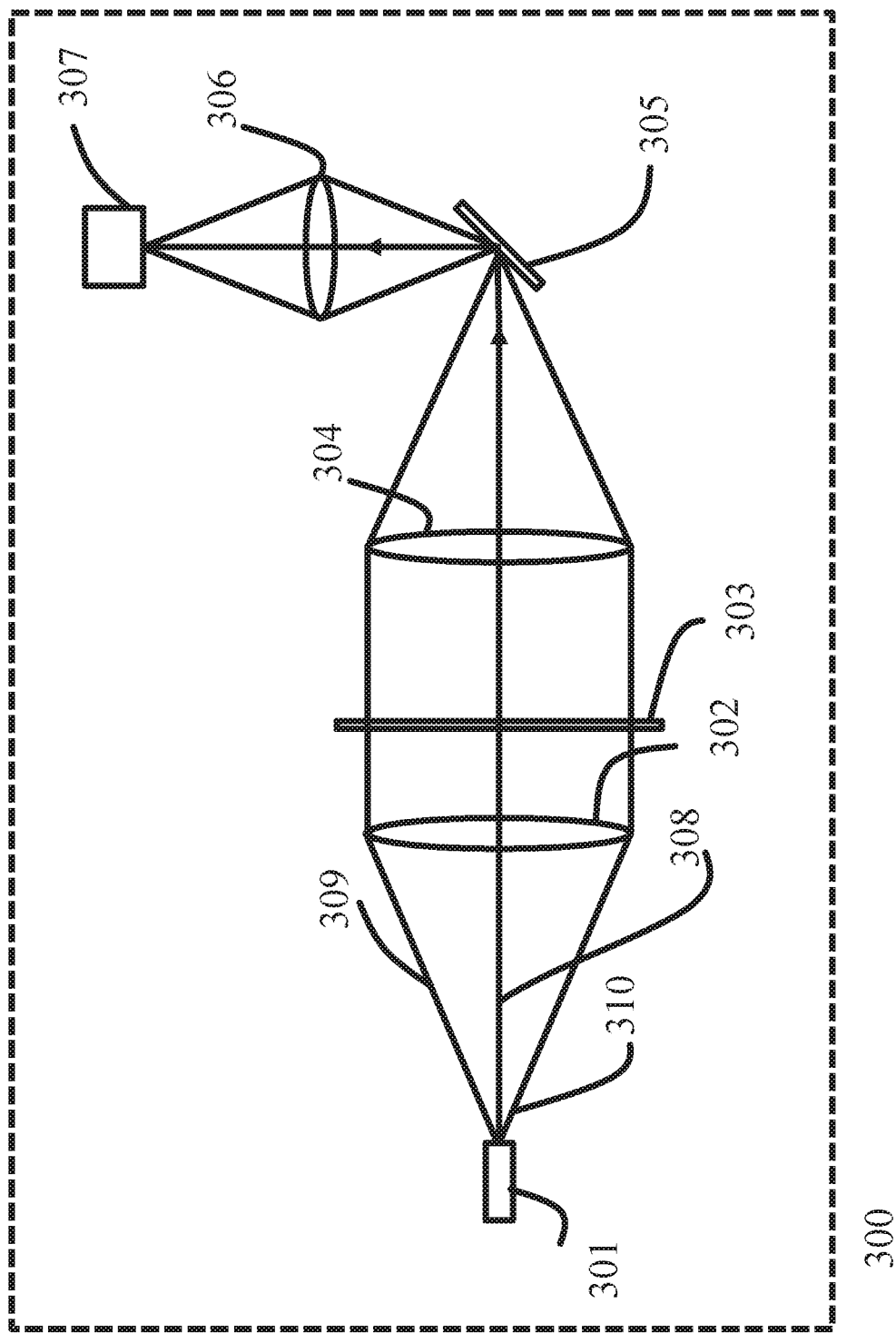
FIG. 3 illustrates a snapshot Mueller matrix polarimeter in a reflection configuration in accordance with an example embodiment.

FIG. 3 illustrates a snapshot Mueller matrix polarimeter 300 in a reflection configuration in accordance with an example embodiment. As illustrated, FIG. 3 shows a similar configuration as in FIG. 2, except that it measures the reflection Mueller matrix. Such a configuration may be suitable for samples that are substantially opaque. In particular, the light 308, 309, 310 from the source 301 is collimated by lens 302, passes through a polarizer filter array 303 and is imaged onto the sample 305 that is positioned at an angle with respect to the optical axis defined by ray 308. The light that is reflected from the sample 305 is imaged by the lens 306 onto an imaging polarimeter 307. The angle of the incident and output light can be varied in both configurations.

Figure 4:
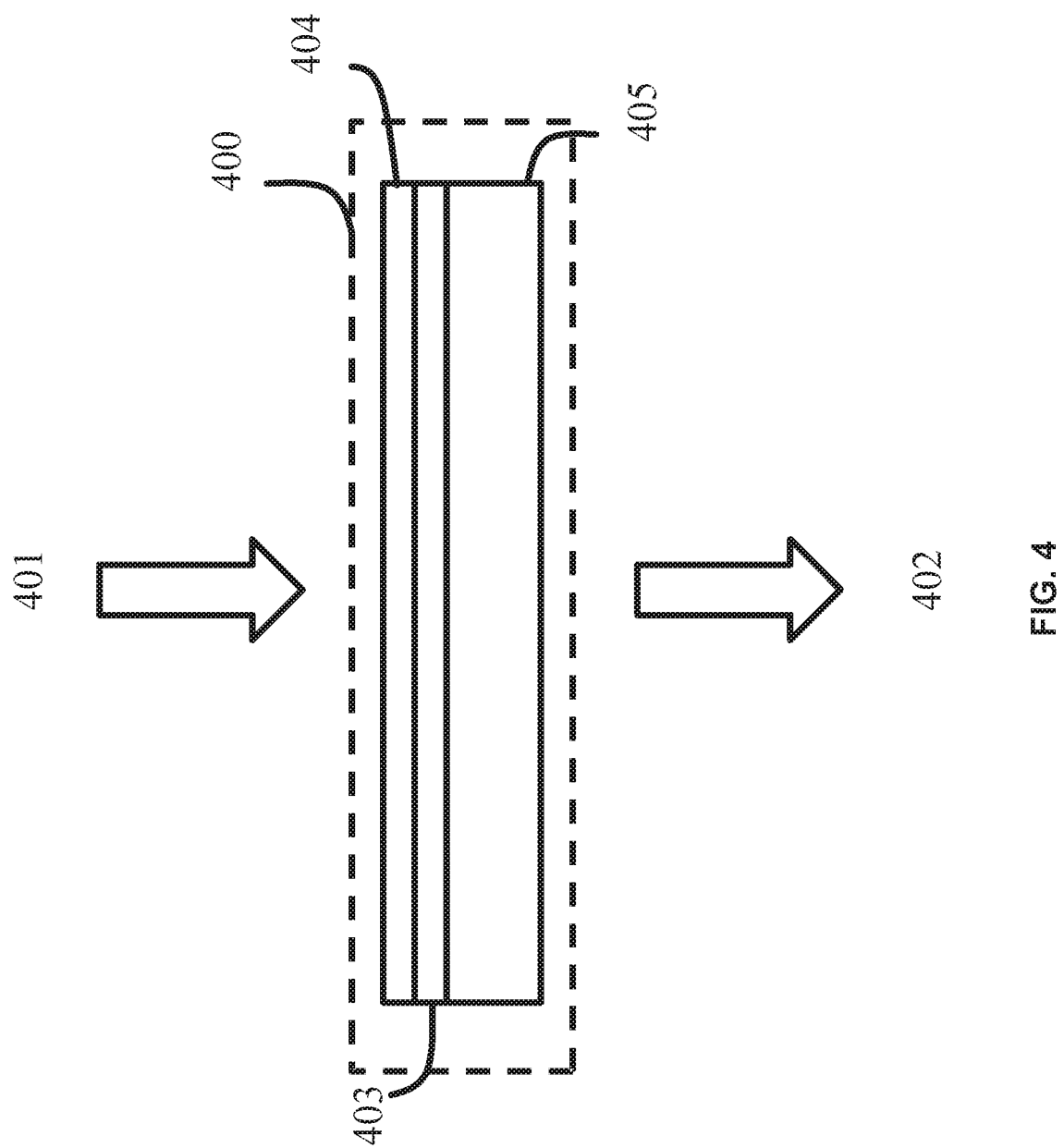
FIG. 4 illustrates a cross-section of a polarizer filter array in accordance with an example embodiment.

A cross-section of an example polarizer filter array is shown in FIG. 4. The filter 400 includes a substrate 405, a polarizer 404 and a retarder 403. The substrate 405 can be substantially transparent. The polarizer 404 can be a linear polarizer that produces light having a particular linear polarization. The retarder 403 (sometimes also referred to as a waveplate, e.g., a half-waveplate, or a quarter waveplate) produces light having a particular polarization. Collimated input light 401 passes through the filter 400. The polarization state of the input light 401 is modified by the filter 400 at different spatial locations. The collimated output light 402 has different polarization state compared to the input light 401.

FIG. 5A illustrates the top view of one example polarization filter array that includes four different polarizer and retarder sections (or layers) in accordance with the disclosed embodiments. The filter array in FIG. 5A can, for example, represent a top view of at least a portion of the filter 400 in FIG. 4, with input light 401 being directed, e.g., into the page. After passing through the filter, the input light 401 is converted to four different polarization states, described by Stokes vectors $S_A$, $S_B$, $S_C$, and $S_D$. Alternatively, FIG. 5B illustrates another example filter array that includes sixteen different polarizer and retarder sections. After passing through the filter, the input light 401 is converted to sixteen different polarization states (having Stokes vectors, $S_a$ to $S_p$). The number of different polarizer and retarder sections is not limited to sixteen and can be determined by the data reduction requirement of the polarimeter. For example, in order to improve the accuracy of the Mueller matrix information, the number of filter subsections may be increased to provide redundancy. On the other hand, increasing the number of filter subsections may not be advantageous if the sample under test has spatially varying characteristics over the projected area of the filter pattern. In general, the number and size of the patterns on the filter can be varied depending on the characteristics (e.g., homogeneity) of the sample and the accuracy requirements for the measurements. Additionally, the shape and tiling of the filters are not limited to square or rectangular grids or arrays; for example, in some embodiments, the filters can be arranged in an arbitrary shape or can even be non-periodic. One key feature of this technique is that the different generated polarization states are adjacent and close to each other. When light is collimated and passes through an object, the different polarization states sample a homogeneous region of the object. Thus, the disclosed techniques can be especially advantageous for objects having optical properties that do not significantly change spatially over the sampling region. Using the example configuration of FIG. 2, the combination of the light source 201, the lens 202 and the filter array 203 serves as a polarization state generator that provides a spatially distributed polarization pattern instead of temporally distributed states.

After passing through the object of interest, the image of the different polarization states can be measured using an imaging polarimeter. Examples of an imaging polarimeter are described in U.S. Pat. No. 8,866,997 and U.S. Patent Application Publication Number 2016/0170110, which are incorporated by reference herein for all purposes. The imaging polarimeter, also called polarization camera, measures the output Stokes vector at different locations. The measured output Stokes vectors are correlated with the input Stokes vectors using the polarimeter data reduction process to calculate the Mueller matrix of the object. The array filter can be a combination of a wire grid polarizer and a liquid crystal polymer retarder fabricated using photoalignment of liquid crystal polymer. For large arrays, the array filter can be fabricated using laser direct writing.

Figure 6:
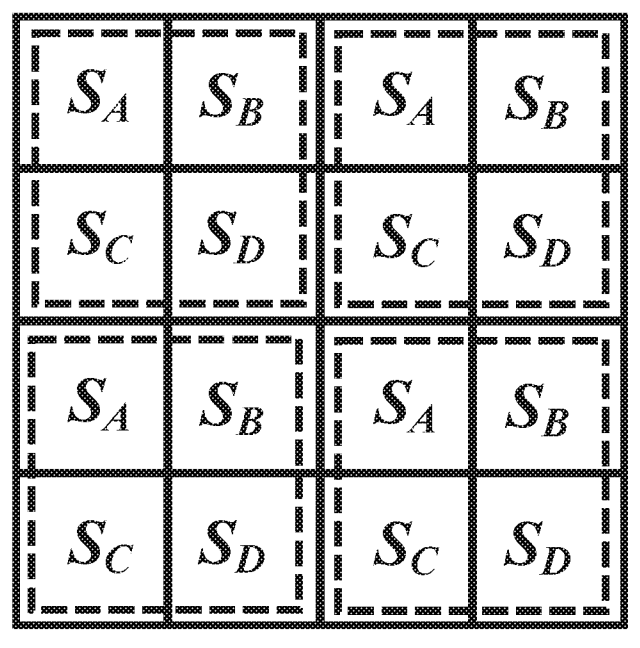

The configurations in FIG. 2 and FIG. 3 describe a Mueller matrix polarimeter that performs measurement at a single point. The dimension of the filter in the array filter (e.g., the smallest side on a subarray) can range from 1 to 100 microns or larger. As noted earlier, reduction optics can be utilized to de-magnify the output of the array filter to a small area on the sample object. Although the aforementioned technique permits the measurement of the Mueller matrix at a single location, the technique can be generalized to allow the measurement of the Mueller matrix at multiple locations at the same time. Such an instrument may be called a Mueller matrix imaging polarimeter. The optical layout for such an instrument would be similar to that shown in FIG. 2 and FIG. 3. However, in this case, the filter array can be modified to have, for example, four sets of filters as shown in FIG. 6. Each filter set can include four filters that represent four output polarization states used to measure the Mueller matrix at one location. Thus, in the example shown in FIG. 6, sixteen filters can be used to measure the Mueller matrix at four different locations of the sample (each filter set is imaged onto one particular section of the sample). The number of locations can be extended by using a larger set of filter array.

Figure 7:
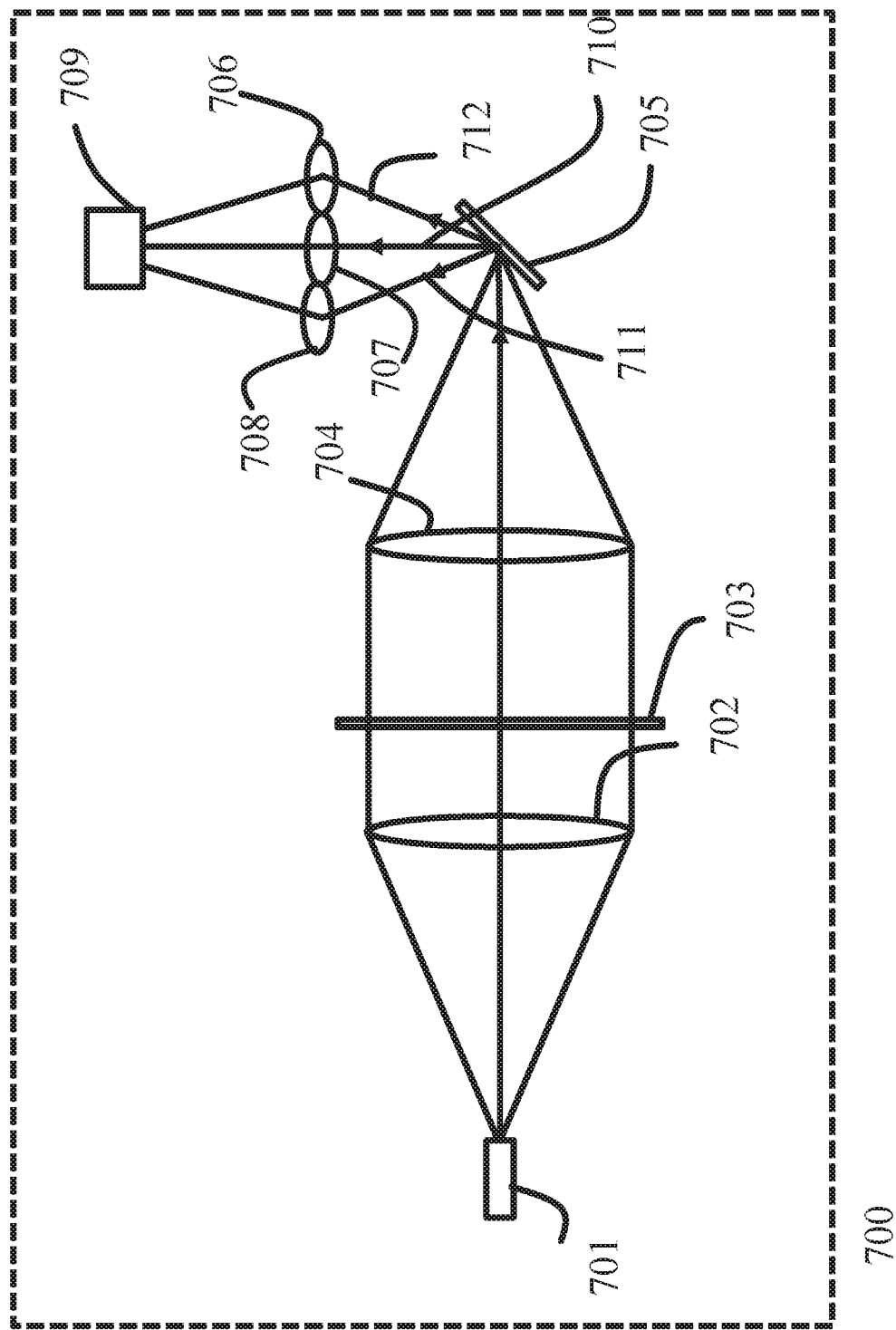
FIG. 7 illustrates an alternative embodiment of a snapshot Mueller matrix polarimeter in a reflection configuration in accordance with an example embodiment.

FIG. 7 illustrates an alternative embodiment of the configuration shown in FIG. 3 that allows determination of the Mueller matrix in the reflection mode. In particular, the lens 306 in front of the detector in FIG. 3 is replaced by an array of lenses, 706, 707 and 708, as shown in FIG. 7. In this embodiment, the set of light rays 710 at the center (one ray is shown for convenience) pass through the lens 707 and is incident on one location of the imaging polarimeter 709. The set of light rays 711 at one periphery (one ray is shown for convenience) pass through the lens 708 and is incident on a different location of the imaging polarimeter 709. The set of light rays 712 at the other periphery (one ray is shown for convenience) pass through the lens 706 and is incident on another location of the imaging polarimeter 709. In this configuration, the set of light rays, 710, 711 and 712, which are reflected from the sample 705 at different angles and are spatially separated by lenses 706, 707 and 708, are measured separately by the imaging polarimeter 709. In this way, the Mueller matrix of the sample 705 at three different incident angles can be measured simultaneously. The Mueller matrix is generally dependent on the angle of incident light, and the embodiment in FIG. 7 can measure this dependency without physically rotating the sample. The system 700 can be generalized to a larger number of angles by increasing the number of lenses in the lens array. The number of pixels in the imaging polarimeter 709 must also increase correspondingly in order to sample the different polarization states at the different angles.

Figure 8:
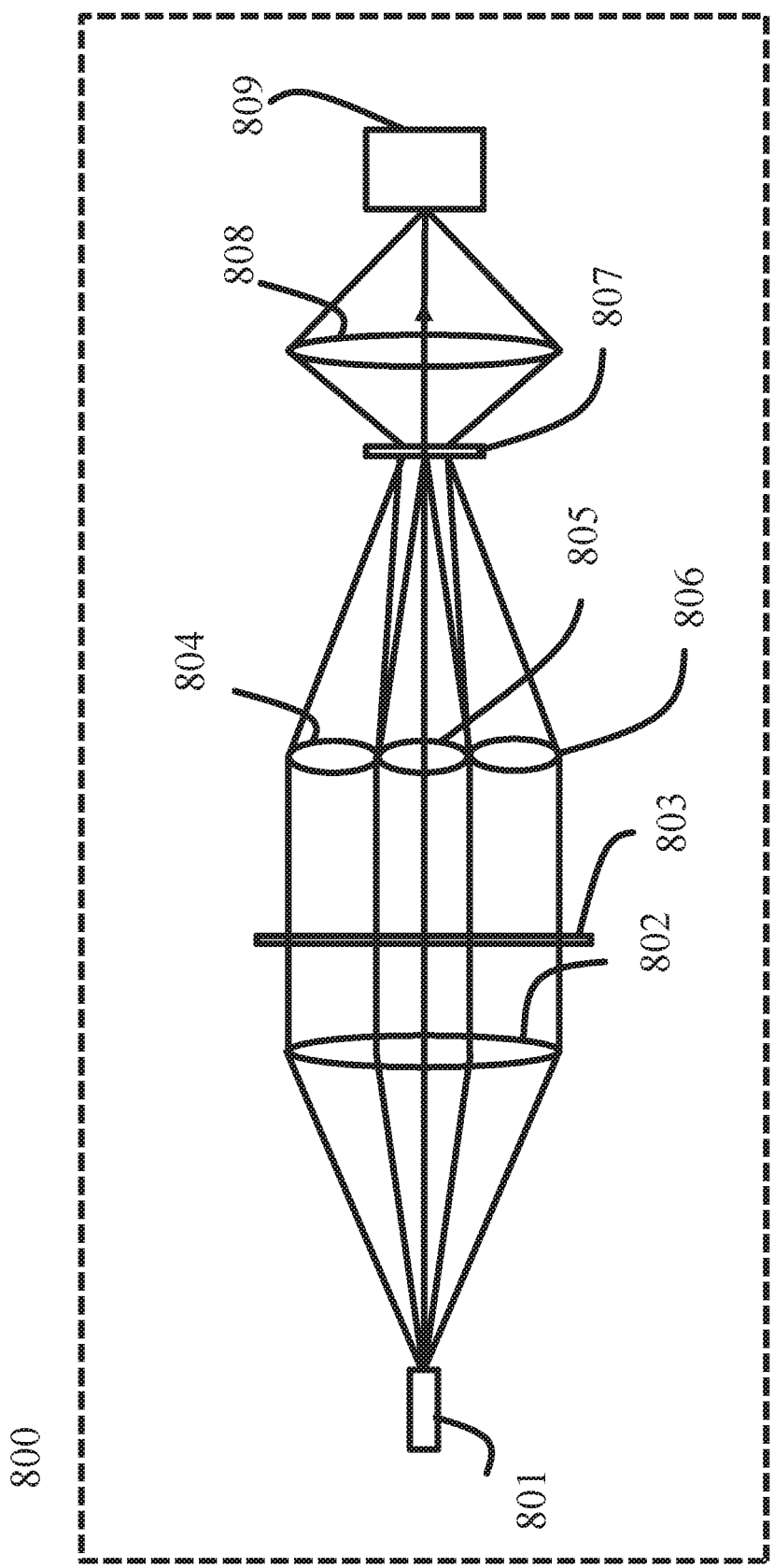
FIG. 8 illustrates an alternative embodiment of a snapshot Mueller matrix polarimeter in a transmission configuration in accordance with an example embodiment.

FIG. 8 illustrates an alternative embodiment of the configuration that is shown in FIG. 2. In particular, the lens 204 in front of the sample in FIG. 2 is replaced by an array of lenses, 804, 805 and 806, as shown in FIG. 8. The remaining elements (e.g., light source 801, lens 802, filter 803, sample 807) remain similar to their counterparts in FIG. 2. In the embodiment of FIG. 8, the different polarization states created by the polarizer filter array 803 are projected onto the sample 807, at different lateral locations. The transmitted light at the different locations of the sample 807 is collected by the lens 808 onto the imaging polarimeter 809. The system 800 measures the Mueller matrix at different locations of the sample without physically moving the sample. The system 800 can be generalized to a larger number of locations by increasing the number of lenses in the lens array.

It should be note that the polarizer filter array in the various disclosed embodiments is used to generate a set of input polarization states that are projected onto a sample with specific goal of measuring the Mueller matrix of the sample. The generated states are not random, and the number of states is greater than or equal to four in order to reconstruct the Mueller matrix.

Moreover, unlike the techniques related to structural illumination, where a set of spatially varying fringes is projected onto an object in a scene, the embodiments of the disclosed technology utilize a polarizer filter array to project a set of polarization states in two directions, as for example shown in FIGS. 5A and 5B. The projection pattern is designed for measuring the Mueller matrix of the object, while the intensity of the projected light is constant in order to maximize the amount of reflected or transmitted light. The state of light is not chosen to maximize contrast, but rather, is chosen to measure the Mueller matrix with highest signal-to-noise ratio. Furthermore, the wavelength of light can range vary widely, e.g., from ultraviolet, to visible to infrared.

Figure 9:
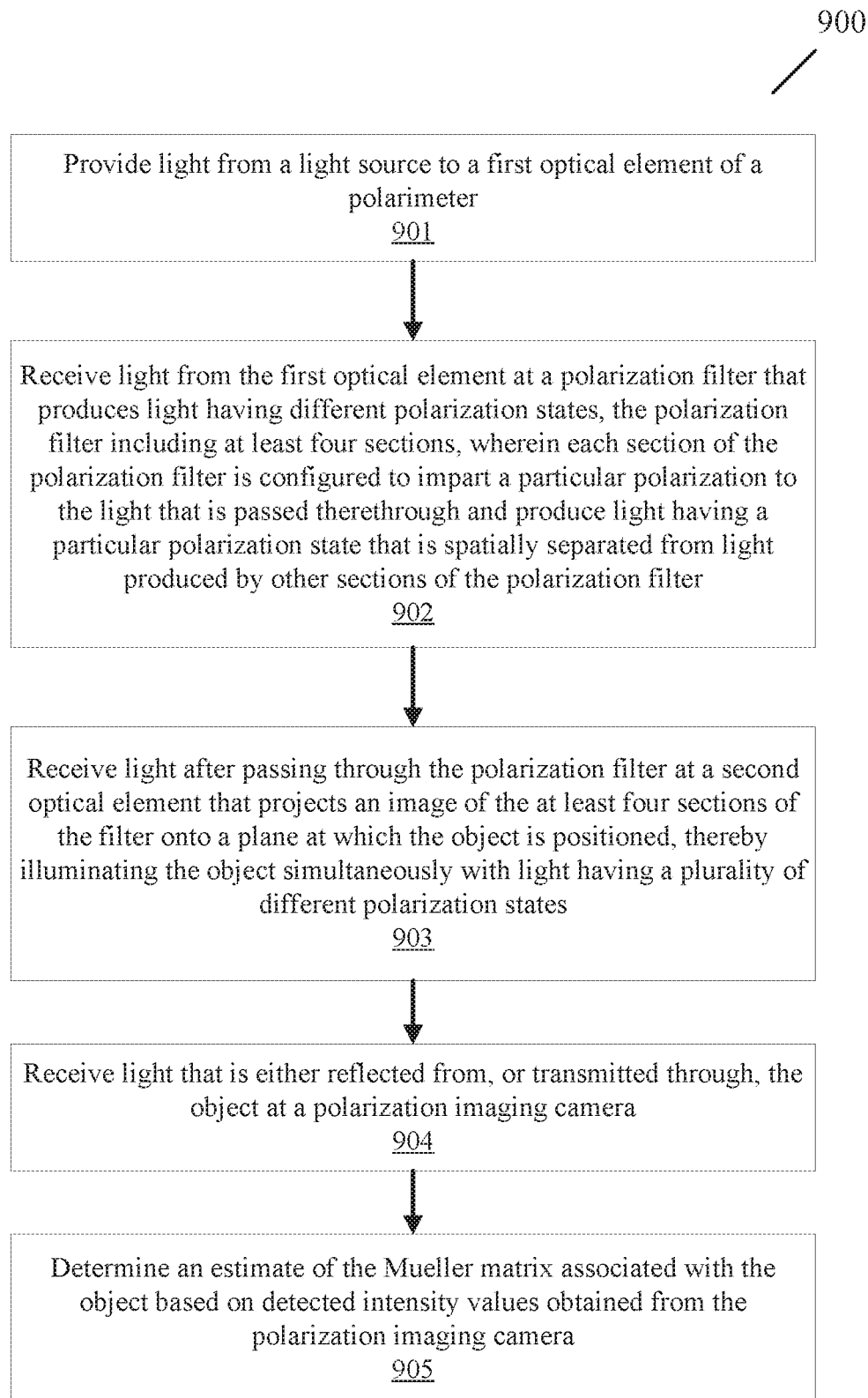
FIG. 9 illustrates a set of operations for determining an estimate of a Mueller matrix associated with an object in accordance with an example embodiment.

FIG. 9 illustrates a set of operations 900 which may be carried out for determining an estimate of a Mueller matrix associated with an object in accordance with an example embodiment. At 901, the operations include providing light from a light source to a first optical element of a polarimeter. At 902, light from the first optical element is received at a polarization filter that produces light having different polarization states. The polarization filter includes at least four sections, where each section of the polarization filter is configured to impart a particular polarization to the light that is passed therethrough and produce light having a particular polarization state that is spatially separated from light produced by other sections of the polarization filter. At 903, light after passing through the polarization filter is received at a second optical element that projects an image of the at least four sections of the polarization filter onto a plane at which the object is positioned, thereby illuminating the object simultaneously with light having a plurality of different polarization states. At 904, light that is either reflected from, or transmitted through, the object is received at a polarization imaging camera. At 905, an estimate of the Mueller matrix associated with the object is determined based on detected intensity values obtained from the polarization imaging camera.

In some example embodiment an intensity of light received at the polarization imaging camera corresponding to each of the at least four sections is substantially constant. In one example embodiment, the light from the light source is in an ultraviolet or an infrared range of wavelengths. In still another example embodiment, determining the estimate of the Mueller matrix is performed using a single captured image of the object. In yet another example embodiment, determining the estimate of the Mueller matrix includes determining an estimate of the Mueller matrix at different locations of the object without physically moving the object.

One aspect of the disclosed embodiments relates to a single shot polarimeter that includes a first optical element or elements positioned to receive light from a light source and to produce collimated light, and a polarization filter positioned to receive the collimated light and to produce light having different polarization states. The polarization filter includes at least four sections, where each section of the polarization filter is configured to receive a portion of the collimated light and to produce light having a particular polarization state that is spatially separated from light produced by other sections of the polarization filter. The single shot polarimeter also includes a second optical element or elements positioned to receive the light having different polarization states and to image the at least four sections of the filter onto a plane of a sample object. The single shot polarimeter further includes an imaging section including one or more optical elements positioned to receive light that is either transmitted through or reflected from the sample object and to image a section of the sample object onto a detector.

In some example embodiments, the single shot polarimeter includes the light source, where the light source is one of a laser source, a white light source, or a white light source and filtering components configured to remove one or more spectral components of the white light source. In one example embodiment, each section of the polarization filter includes a retarder and a polarizer, where the combination of the retarder and the polarizer in each section of the polarization filter causes light that is output from each section of the polarization filter to have the particular polarization state. In another example embodiment, the polarization filter further includes a substantially transparent substrate.

According to one example embodiment, the polarization filter includes four sections, wherein: light that is output from a first section of the four sections is characterized as having a first Stokes vector, light that is output from a second section of the four sections is characterized as having a second Stokes vector, light that is output from a third section of the four sections is characterized as having a third Stokes vector, and light that is output from a fourth section of the four sections is characterized as having a fourth Stokes vector. The first, the second, the third and the fourth Stokes vectors are different from one another.

In another example embodiment, the polarization filter includes sixteen sections, and each section of the sixteen sections is configured to produce output light characterized by one of sixteen Stokes vectors. In one example embodiment, the polarization filter is configured to produce light that is output from the at least four sections to have substantially a constant intensity. In another example embodiment, the at least four sections of the polarization filter form a grid array. In still another example embodiment, the second optical element or elements direct light having the particular polarization states simultaneously onto a finite area on the plane of the sample object with a predetermined magnification or de-demagnification value.

In another example embodiment the second optical element or elements include a lens array comprising a plurality of lenses, each lens of the lens array is configured to receive a portion of the light that passes through the polarization filter, and to provide a corresponding image at the plane of the sample object, and each image at the plane of the sample object is at a different spatial location. In one example embodiment, the imaging section includes a single lens positioned to simultaneously receive light having different polarization characteristics from different spatial locations of the sample object and to direct the light received from the sample object to the detector. In yet another example embodiment, the imaging section includes a lens array including a plurality of lenses, each lens of the lens array is positioned to receive light that is reflected from the sample object at a particular reflection angle or range of reflection angles, and to direct the light that is reflected at the particular reflection angle or range of angles to the detector.

In some example embodiments, the at least four sections of the polarization filter form a first pattern of polarization states that occupy a first region of the polarization filter, and the polarization filter includes at least a second region that also comprises at least four sections having the first pattern of polarization states. In another example embodiment, the at least four sections of the polarization filter form a predetermined pattern of polarization states that is not randomly distributed. In yet another example embodiment, the single shot polarimeter further includes the detector that includes a plurality of pixels.

Another aspect of the disclosed embodiments relates to an optical assembly for use in a polarimeter that includes a first optical element or elements positioned to receive light from a light source, a polarization filter positioned to receive the light from the first optical element or elements and to produce light having different polarization states. The polarization filter includes at least four sections, where each section of the polarization filter is configured to impart a particular polarization to the light that is passed therethrough and to produce light having a particular polarization state that is spatially separated from light produced by other sections of the polarization filter. The optical assembly further includes a second optical element or elements positioned to project an image of the at least four sections of the polarization filter onto a plane to allow simultaneous illumination of a sample object positioned at the plane with the light having a plurality of polarization states with substantially constant intensity.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor and/or various hardware and software modules can be configured to receive and process signals from a polarization imaging camera and to determine estimates of the Mueller matrix associated with various objects.

Various information and data processing operations described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. A single shot polarimeter, comprising:
   a first optical element or elements positioned to receive light from a light source and to produce collimated light;
   a polarization filter positioned to receive the collimated light and to produce light having different polarization states, the polarization filter including at least four sections, wherein each section of the polarization filter is configured to receive a portion of the collimated light and to produce light having a particular polarization state that is spatially separated from light produced by other sections of the polarization filter;
   a second optical element or elements positioned to receive the light having different polarization states and to image the at least four sections of the polarization filter onto a plane of a sample object; and an imaging section including one or more optical elements positioned to receive light that is either transmitted through or reflected from the sample object and to image a section of the sample object onto a detector.

2. The single shot polarimeter of claim 1, including the light source, wherein the light source is one of a laser source, a white light source, or a white light source and filtering components configured to remove one or more spectral components of the white light source.

3. The single shot polarimeter of claim 1, wherein each section of the polarization filter includes a retarder and a polarizer, and wherein the combination of the retarder and the polarizer in each section of the polarization filter causes light that is output from each section of the polarization filter to have the particular polarization state that is different from polarization state of light output from other sections of the polarization filter.

4. The single shot polarimeter of claim 3, wherein the polarization filter further includes a substantially transparent substrate.

5. The single shot polarimeter of claim 1, wherein the polarization filter includes four sections, and wherein:
light that is output from a first section of the four sections is characterized as having a first Stokes vector,
light that is output from a second section of the four sections is characterized as having a second Stokes vector,
light that is output from a third section of the four sections is characterized as having a third Stokes vector, and
light that is output from a fourth section of the four sections is characterized as having a fourth Stokes vector, wherein the first, the second, the third and the fourth Stokes vectors are different from one another.

6. The single shot polarimeter of claim 1, wherein the polarization filter includes sixteen sections, and each section of the sixteen sections is configured to produce output light characterized by one of sixteen Stokes vectors.

7. The single shot polarimeter of claim 1, wherein the polarization filter is configured to produce light that is output from the at least four sections to have substantially a constant intensity.

8. The single shot polarimeter of claim 1, wherein the at least four sections of the polarization filter form a grid array.

9. The single shot polarimeter of claim 1, wherein the second optical element or elements are positioned to direct light from each of the polarization filter simultaneously with light from other sections of the polarization filter onto a finite area on the plane of the sample object with a predetermined magnification or de-demagnification value.

10. The single shot polarimeter of claim 1, wherein:
the second optical element or elements includes a lens array comprising a plurality of lenses,
each lens of the lens array is configured to receive a portion of the light that passes through the polarization filter, and to provide a corresponding image at the plane of the sample object, and
each image at the plane of the sample object is at a different spatial location.

11. The single shot polarimeter of claim 1, wherein the imaging section includes a single lens positioned to simultaneously receive light having different polarization characteristics from different spatial locations of the sample object and to direct the light received from the sample object to the detector.

12. The single shot polarimeter of claim 1, wherein the imaging section includes a lens array including a plurality of lenses, each lens of the lens array positioned to receive light that is reflected from different locations of the sample object at a particular reflection angle or range of reflection angles, and to direct the light that is reflected at the particular reflection angle or range of angles to the detector.

13. The single shot polarimeter of claim 1, wherein the at least four sections of the polarization filter form a first pattern of polarization states that occupy a first region of the polarization filter, and the polarization filter includes at least a second region that also comprises at least four sections having the first pattern of polarization states.

14. The single shot polarimeter of claim 1, wherein the at least four sections of the polarization filter form a predetermined pattern of polarization states that is not randomly distributed.

15. The single shot polarimeter of claim 1, further including the detector that includes a plurality of pixels.

16. An optical assembly for use in a polarimeter, comprising:
a first optical element or elements positioned to receive light from a light source;
a polarization filter positioned to receive the light from the first optical element or elements and to produce light having different polarization states, the polarization filter including at least four sections, wherein each section of the polarization filter is configured to impart a particular polarization to the light that is passed therethrough and produce light having a particular polarization state that is spatially separated from light produced by other sections of the polarization filter;
a second optical element or elements positioned to project an image of the at least four sections of the filter onto a plane to allow simultaneous illumination of a sample object positioned at the plane with the light having a plurality of polarization states with substantially constant intensity.

17. A method for determining an estimate of a Mueller matrix associated with an object, comprising:
providing light from a light source to a first optical element of a polarimeter;
receiving light from the first optical element at a polarization filter that produces light having different polarization states, the polarization filter including at least four sections that are spatially dispersed on the polarization filter, wherein each section of the polarization filter is configured to impart a particular polarization to the light that is passed therethrough and produce light having a corresponding polarization state that is spatially separated from light produced by other sections of the polarization filter;
receiving light after passing through the polarization filter at a second optical element that produces an image of the at least four sections of the filter onto a plane at which the object is positioned, thereby illuminating the object simultaneously with light having a plurality of different polarization states;
receiving light that is either reflected from, or transmitted through, the object at a polarization imaging camera; and
determining an estimate of the Mueller matrix associated with the object based on detected intensity values obtained from the polarization imaging camera.

18. The method of claim 17, wherein an intensity of light received at the polarization imaging camera corresponding to each of the at least four sections is substantially constant.

19. The method of claim 17, wherein the light from the light source is in an ultraviolet or an infrared range of wavelengths.

20. The method of claim 17, wherein determining the estimate of the Mueller matrix is performed using a single captured image of the object.

21. The method of claim 17, wherein determining the estimate of the Mueller matrix includes determining an estimate of the Mueller matrix at different locations of the object without physically moving the object.

* * * * *